INVENTORS.
RICHARD BRIMLEY
LYNN F. MARGETTS
HYRUM RUSSELL MARGETTS
BY
*their* ATTORNEY

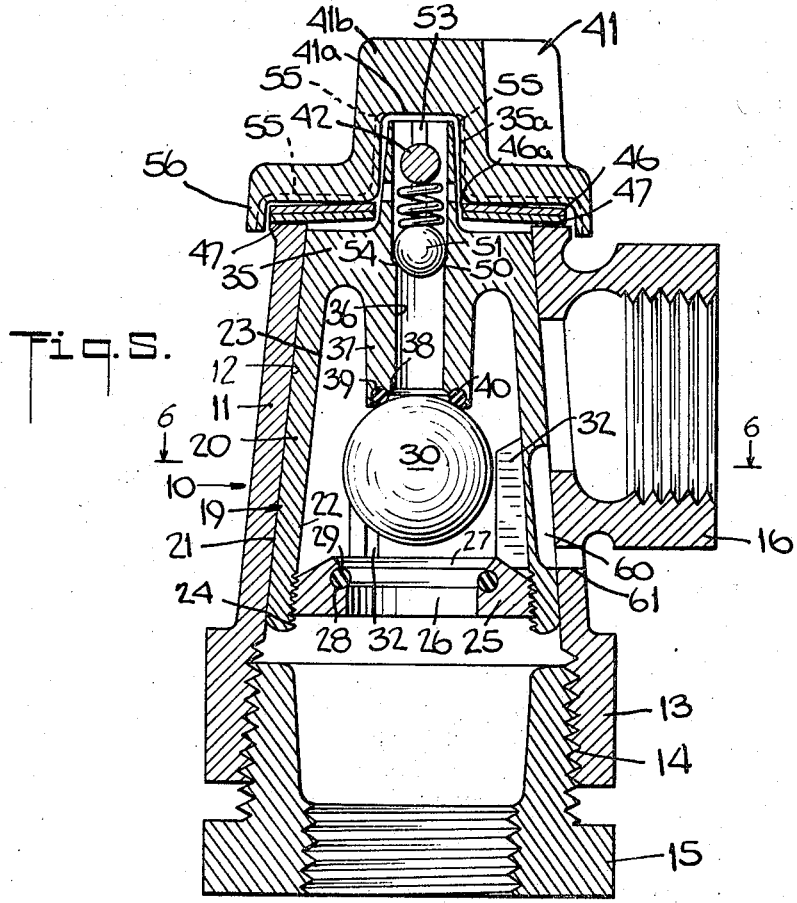
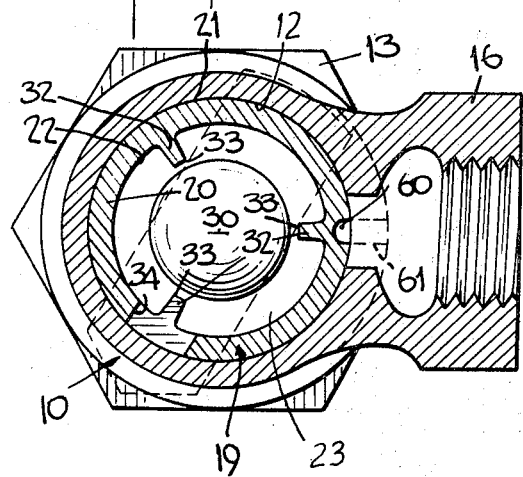
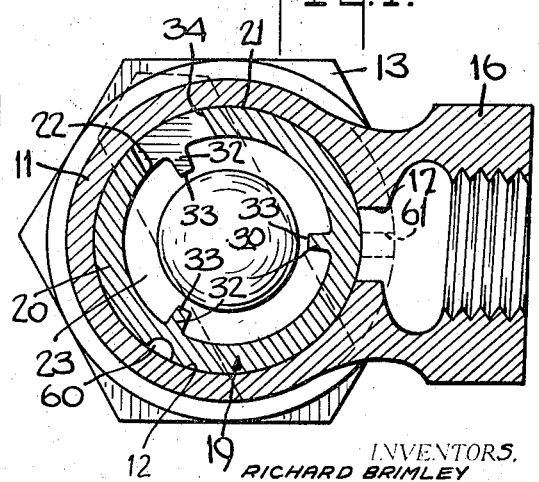

United States Patent Office 3,424,184
Patented Jan. 28, 1969

3,424,184
VENTING ANTISIPHON ROTARY PLUG VALVE WITH DRAINAGE MEANS
Richard Brimley, 1788 E. 17th S., Salt Lake City, Utah 84108; Lynn F. Margetts, 2221 Preston St., Salt Lake City, Utah 84106; and Hyrum Russell Margetts, 2671 E. 33rd S., Salt Lake City, Utah 84109
Filed Oct. 18, 1966, Ser. No. 587,449
U.S. Cl. 137—102                                          7 Claims
Int. Cl. F16k *45/00;* E03c *1/10*

This invention relates to rotary plug type valves and is directed particularly to rotary plug type valves having antisiphon, venting and waste discharge means in combination with the valve.

In various types of fluid supply systems chemicals are added to the system for delivery with the fluid. In many agriculture, manufacturing and chemical processes chemicals are added to the supply conduits. In sprinkling systems fertilizers are often added to the water, and in addition to fertilizers, insecticides, defoliating agents, weed killers and the like are dissolved by the water.

As long as pressure of the water supply is maintained at the proper level there is no problem with the added chemicals. However, on occasions there is a loss of water pressure and a siphoning action occurs to draw the chemical bearing water back into the supply to a point where the chemicals may be distributed to locations where they are not desired and may be harmful. To prevent this reverse or back-flow antisiphoning devices are intermediately installed between the supply and the insertion of the chemicals into the system. If a reversal of pressure occurs the antisiphoning means closes and prevents the chemical bearing water from returning to the supply.

In addition to antisiphoning means it is also desirable to have a shut-off valve, a venting valve for discharge of fluids to atmosphere and a drainage discharge for removal of water from the pipes while the valve is in the closed position. In the past these various pieces of apparatus have been separately installed in the supply conduits, which increases the expense of the installation and its maintenance as well as creating additional joints that have to be tightened and sealed.

An object of the invention is to provide a valve which combines antisiphoning means, venting means and waste discharge means in a single unit.

Another object of the invention is to provide a rotary plug type valve with an antisiphoning means and a venting means having a check valve for preventing reverse flow in the venting means.

Other and further objects will be apparent from the description of an embodiment of the invention taken in connection with the drawings in which:

FIG. 5 is a longitudinal sectional view of the valve in the waste discharge position;

FIG. 6 is a sectional view taken along lines 6—6 of FIG. 5; and

FIG. 7 is a sectional view taken along lines 3—3 of FIG. 1 with the valve in the closed position.

Figure 1:
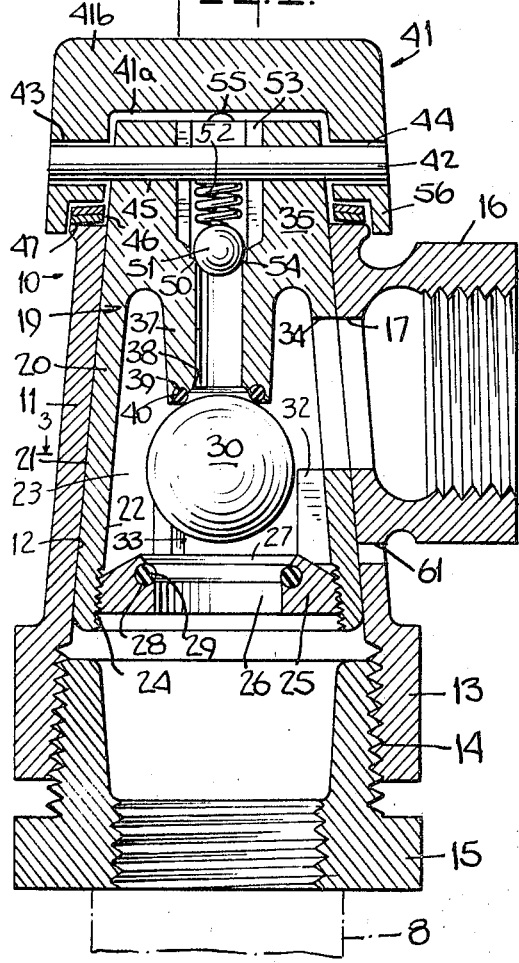
FIG. 1 is a longitudinal sectional view through the main axis of a rotary type plug valve set for passing water through the valve.
Figure 2:
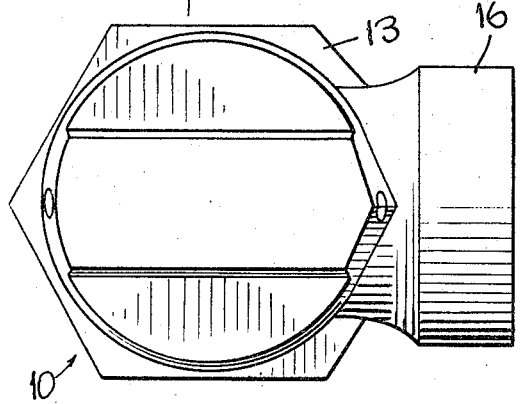
FIG. 2 is a top view of the valve.
Figure 3:
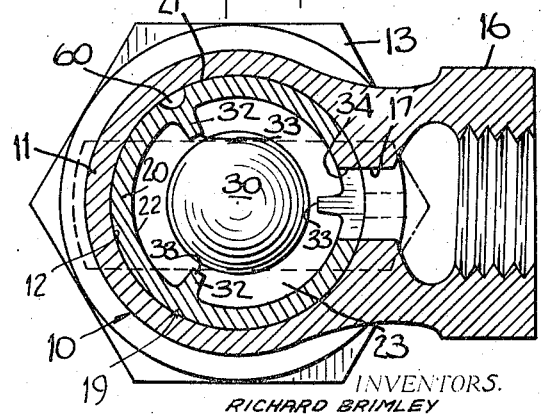
FIG. 3 is a lateral sectional view taken along lines 3—3 of FIG. 1.

Referring to FIGS. 1 to 3 the rotary plug type valve is connected between the main or fluid supply pipe or inlet conduit 8 and the discharge pipe or outlet conduit 9 and comprises and outer casing or valve body 10 of a hollow truncated cone shape. The casing has a conical-shaped wall 11 with an inner conical-shaped wall 12 having circular top and bottom openings. A boss 13 is provided at the larger or wider end of the wall 11 and has inner threads 14 for receiving the threaded bushing 15. The bushing has a threaded opening for the inlet conduit 8. On the side of the wall 11 is the discharge boss 16 extending from the side 11 and encircling the discharge port 17. The boss 16 has inner threads for the outlet pipe 9. The bosses and bushing having hexagonal heads for receiving wrenches.

Figure 4:
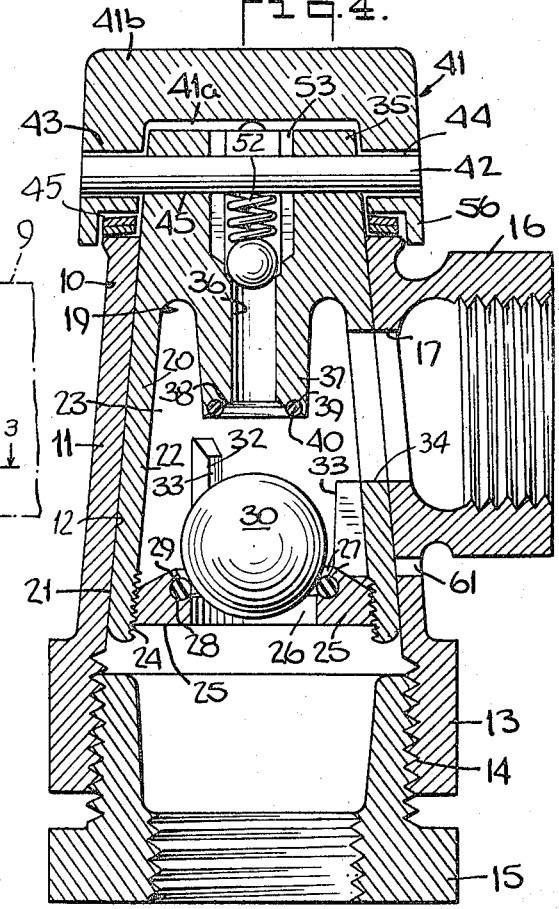
FIG. 4 is a longitudinal sectional view of the valve and illustrates the valve under siphoning conditions.

A truncated conical-shaped valve plug 19 has a conical-shaped wall 20 with an outer surface 21 and an inner surface 22. The outer surface 21 is fitted in through the boss 13 without the bushing 15 and seated in rotatable sealing relation with the surface 12. The inner surface 22 forms a valve chamber 23. The conical plug wall 20 has at the wider inlet end a threaded portion 24 for receiving the exteriorly threaded seating ring 25 with a centrally positioned inlet opening 26. The seating ring 25 has a conical surface 27 with an annular groove 28. An O-ring 29 is firmly fitted in the groove 28 to form the main seat. A spherical ball 30 rests on the O-rings 29 for sealing the inlet opening 26 when the pressure in the chamber 23 is less than atmospheric and greater than the pressure in the inlet chamber 18 connected to the pipe 8. The valve plug 19 has three ribs 32 perpendicular to the surface 22 and extending longitudinally to provide guide surfaces 33 for maintaining the ball 30 substantially in alignment with the opening 26 and the O-ring 29. The valve plug 19 has a plug port 34 through the wall. The plug port 34 and the discharge port 17 have the same generally circular configuration and are illustrated in mating relation for passage of fluids in FIGS. 1 and 4.

The upper end of the plug opposite to the inlet end has an actuating portion 35 forming a top wall closing the upper end of the chamber 23. A cylindrical boss 37 extends axially downward from the actuating portion in concentric spaced relation to the plug wall 20 and has a cylindrical venting passage 36 extending axially therethrough and through the actuating portion for connecting the chamber 23 to atmosphere. The boss 37 has a downwardly facing conical surface 38 around the end of the passage 36. The surface 38 has a groove 39 with an O-ring 40 forming the vent seat for the ball 30 when in the upper position as illustrated in FIG. 1. The vent seat faces the main seat with the ball 30 therebetween. The ball 30 moves vertically along the main longitudinal axis of the valve guided by the ribs 32 to seat either in the inlet O-ring 29 or the vent O-ring 40.

The actuating portion 35 has a rectangularly shaped key or boss 35a extending upwardly and diametrically across the top of the plug. A knob or cap 41 fits over the casing wall 11 and plug 19. The boss 35a interfits with a rectangularly shaped slot 41a in the rectangular gripping portion 41b also extending diametrically across the cap. A cylindrical pin or shaft 42 passes through the radial bores 43, 44 in the knob 41 and the radial bore 45 in the boss 35a. Circular spring washers 46 having slots 46a fit over the boss 35a of the actuating portion 35 and are positioned between the knob 41 and the lateral or radially extending surface 47 on top of the wall 11. The spring washers 46 are curved to force the knob 41 and the plug 19 upwardly to press the relatively rotatable conical surfaces 12 and 21 into fluid sealing relation.

The actuating portion 35 has a check valve seat 50 intermediately positioned in the passage 36 for receiving the check ball 51. The check ball 51 is held against the seat 50 by a helical spring 52 fitting in the passage 36 and seating against the ball 51 and the shaft 42. Thus the check ball 51 is normally held in seating engagement with the check valve seat 50 for closing and sealing the passage 36. This prevents the entry of foreign matter from outside the valve.

On diametrically opposite sides of the passage 36 the actuating portion 35 has vent by-pass channels 53 extending down to the annular space 54 around the check valve and seat. On venting of the plug valve the check ball 51 is raised and discharge occurs through the passage 36, annular space 54 and by-pass channels 53 to the top of the actuating portion 35. The knob 41 has vent channels 55 extending downwardly in the gripping portion on opposite sides of the key or boss 35a to the flange 56 of the knob for passing the discharge to atmosphere. The cap and flange 56 cover the end and overlap the casing 10 to protect against the entry of foreign matter into the valve. The check ball provides a block to reverse flow into the valve.

The wall 20 of the valve plug 19 has a waste discharge passage or channel 60 extending vertically in the wall to connect the discharge port 17 with the waste port 61 in the wall 11 of the casing 10. The waste port is below the discharge port 17. The channel 60 communicates with the lower part of the port to drain the pipe 9. As is seen from FIG. 5 the passage or channel 60 and plug port 34 are circumferentially spaced so that the discharge port is isolated and sealed from the chamber 23. As illustrated in FIGS. 3, 6 and 7 the waste channel 60 is at 120° to the plug port 34.

For completely closing the valve the solid area 62 of the surface 21 extends across the discharge port 17 (FIG. 7) blocking any flow into or back-flow from the conduit 9. The ball 30 is forced against the O-ring 40, as illustrated in FIG. 5, to block the vent passage 36. The check valve ball 51 is seated in place to prevent any intake from outside of the valve through the vent passage 36. The position of the knob 41 is indicated by aligning the knob with the plug port 34 so that when this is in alignment with the boss 16 or outlet pipe 9, the valve is open (FIG. 3). When the knob is positioned 120° clockwise, the waste channel 60 is in communication with the discharge port (FIG. 6). When the knob is positioned 120° counterclockwise, as shown in FIG. 7, the valve is shut.

Under normal conditions when the pressure gradient in the main pipe 8 is normal, the flow is from inlet pipe 8 through the inlet opening 26 and chamber 23 to outlet pipe 9 through the discharge port 17. The ball 30 is held in position against the vent seat O-ring 40 to seal the vent passage 36 and the fluid is supplied to the pipe 9. When the valve is completely shut or the waste channel is connected to the discharge port, the pressure of the fluid in the pipe 8 and chamber 23 holds the ball 30 against the O-ring 40 and thus seals any discharge through the vent passage 36. The ball 30 remains seated on the O-ring 40 as long as the pressure in the chamber 23 remains above atmospheric pressure. In case the pressure in the inlet pipe 8 drops and a siphoning action occurs, the differential in pressure will set the ball 30 on the main seat O-ring 29 so as to prevent any back-flow into the chamber 18 and inlet pipe 8.

The valve plug and casing may be made of any suitable material, such as brass or the like. The ball 30 is a complete sphere and also may be made of any suitable material. It is, however, preferable that the ball is of greater density than the fluid passed by the valve. The differential between the weight of the ball and the weight of the displaced fluid is added to the reverse flow created by the siphoning action to promptly seat the ball on the O-ring 29 and stop the reverse flow. This differential may be adjusted to set the difference between the line pressure and the atmospheric pressure which moves the ball from the vent seat to the main seat as the line pressure drops.

In a sprinkler system for agricultural use the pipe 8 is connected to a supply of water and the pipe 9 is connected to the sprinkler through means for injecting fertilizer, insecticides or other chemicals into the water before it reaches the sprinkler. With the valve in open position (FIG. 3) the line pressure of the water in pipe 8 raises the ball from the main seat and holds it against the vent seat. The passage 36 to atmosphere is thus sealed from the greater line pressure. The chamber 23 is filled with flowing water which passes through ports 34 and 17 to pipe 9. The flow of water through the chamber 23 maintains the ball and O-ring 29 for sealing on seating of the ball. On a failure of the line pressure and creation of a siphon the ball 30 promptly drops and seals the inlet opening 26. This prevents a reverse flow of chemical bearing water. This also unblocks the passage 36 providing a discharge path for the water in pipe 9 and chamber 23 if a back pressure developed due to gravity action. When the system is shut down, the plug 19 may be rotated to communicate with port 17 to permit drainage of the chemical bearing water from the pipe 9 (FIG. 6). Thus when a new supply of water is provided there is no danger of contamination of the supply. The system can be closed by positioning the plug in the counterclockwise position of FIG. 7.

A feature of this valve is that it may be used for pressure relief in supplying water to a water heater or the like. If the pressure in the boiler or hot water tank becomes greater than the line pressure, the ball 30 will be held against the vent seat and pressure relief is provided in the main water supply. If the ball 30 is on the main seat, then pressure relief is provided through the passage 36. In the case of water heaters there is no concern for contamination, since chemicals are not added.

It is seen from the foregoing description that the invention provides a single apparatus with multiple functions that heretofore have required several units separately installed. This simplifies the installation of water supply systems and reduces cost and labor. The check valve ball 51 and spring 52 may be omitted and the chamber 23 connected to atmosphere when the ball is not seating on the O-ring 29. The protection provided by the cap 41 may in many installations be sufficient to prevent the entrance of foreign matter from the atmosphere. Although the foregoing embodiment describes the valve with a conical shape, it may be other shapes, such as cylindrical or spherical.

The valve as illustrated in the drawings is proportional to the valve as actually designed and built.

Various other modifications may be made without departing from the invention as set forth in the appended claims.

We claim:

1. A rotary plug valve comprising a hollow casing with an inlet opening and a discharge opening lateral to said inlet opening, a valve plug having a chamber and rotatably seating in said casing, a seating ring mounted in said valve plug adjacent said inlet opening and having an inlet port connecting said inlet opening to said chamber a discharge port in said valve plug lateral to said inlet port for mating with said discharge opening to connect said chamber with said discharge opening and providing a flow path from said inlet opening through said valve plug to said discharge opening, a boss mounted on said valve plug in said chamber and extending towards said seating ring and having a vent passage to atmosphere and a vent opening, a sealing ball positioned between said vent opening and said inlet port for closing either said inlet port or said vent opening, said valve plug having ribs to guide said ball between said inlet port and said vent opening, means for rotating said valve plug for mating said discharge port and opening to permit a flow through said chamber with said ball held against said vent opening on inlet pressure being greater than atmospheric pressure and positioning on said inlet port on inlet pressure being less than atmospheric pressure for preventing reverse flow through said chamber and said inlet and discharge openings.

2. A rotary plug valve comprising a hollow casing with an inlet boss at one end forming an inlet opening and a discharge boss lateral to said inlet boss and forming a discharge opening lateral to said inlet opening, a valve plug rotatably seating in said casing through said inlet opening and having a fluid transmitting chamber therein, a seating ring with an inlet port mounted in said valve plug at the inlet opening end to connect said inlet opening with said chamber, a discharge port lateral to said inlet port mating with said discharge opening to connect said chamber with said discharge opening, a boss in said chamber extending towards said seating ring and having a vent pasage and a vent opening concentric to and axially aligned with said inlet port for connecting said chamber to atmosphere, a sealing ball positioned between said vent opening and said inlet port for closing either said inlet port or said vent opening, said valve plug having ribs extending radially into said valve plug chamber to guide said ball in substantially linear movement between said inlet port and said vent opening, means for rotating said valve plug for mating said discharge port and opening to permit a flow through said chamber with said ball held against said vent opening on the inlet pressure being greater than atmospheric pressure and positioned on said inlet opening on said inlet pressure being less than atmospheric pressure for preventing reverse flow through said chamber and said inlet and discharge openings.

3. A rotary plug valve as set forth in claim 2 wherein said valve plug has an actuating portion at the end opposite to said inlet opening and said vent boss extends therefrom, and said vent passage extends through said actuating portion to the exterior of said valve plug for connecting said chamber to atmosphere.

4. A rotary plug valve as set forth in claim 3 wherein a knob is provided on said valve plug covering the actuating end of said valve plug and casing and having channels extending from adjacent to said passage to the edge of said knob.

5. A rotary plug valve as set forth in claim 4 wherein a shaft extends through said knob and said actuating portion for interlocking said knob and said valve plug for rotating said valve plug.

6. A rotary plug valve as set forth in claim 4 wherein a check valve is provided in said vent passage to prevent flow through said passage into said chamber.

7. A rotary plug valve comprising a conical-shaped casing with a boss at the larger end forming an inlet opening and a discharge boss on the side of the casing forming a discharge opening, a conical-shaped valve plug having a fluid transmitting chamber therein and an actuating portion at the smaller end and a seating ring at the larger end with an inlet port, said conical-shaped valve plug rotatably seating in said casing and having a discharge port in the side thereof for mating with said discharge opening to connect said chamber with said discharge opening, a boss extending towards said seating ring from said actuating portion and having a vent passage with a vent opening concentric to and axially aligned with the inlet opening, a rigid ball positioned between said openings for sealing with said inlet port or vent opening, said conical-shaped valve plug having longitudinal ribs extending radially into said valve plug chamber to guide said ball in substantially linear movement between a respective seating surface, a check valve ball in said actuating portion for preventing inward flow through said vent passage into said chamber, means mounted on said actuating portion for rotating said conical-shaped valve plug for mating said discharge port and opening to permit flow through said chamber with said ball held against said vent opening on inlet pressure being greater than atmospheric pressure and seating on said seating ring on inlet pressure being less than atmospheric pressure for preventing reverse flow through said chamber and permit relief past said check valve ball.

References Cited

UNITED STATES PATENTS

| | | | |
|---|---|---|---|
| 1,191,930 | 7/1916 | Terry | 137—614.17 |
| 1,929,174 | 10/1933 | Lasco | 137—625.24 |
| 2,764,174 | 9/1956 | Wilson | 137—102 |
| 3,291,153 | 12/1966 | Chabrier et al. | 137—102 XR |

FRANK J. COHEN, *Primary Examiner.*

W. H. SCHROEDER, *Assistant Examiner.*

U.S. Cl. X.R.

137—614.16, 625.22